(No Model.) 4 Sheets—Sheet 1.

Z. C. PHILLIPS.
GRINDING MILL.

No. 246,906. Patented Sept. 13, 1881.

Witnesses
Fred G. Dietrich
P. C. Dietrich

Inventor.
Zachariah C. Phillips,
By J. J. Johnston,
his attorney.

(No Model.) 4 Sheets—Sheet 3.

Z. C. PHILLIPS.
GRINDING MILL.

No. 246,906. Patented Sept. 13, 1881.

Witnesses:

Inventor:
Zachariah C. Phillips,
By J. J. Johnston,
his attorney.

(No Model.) 4 Sheets—Sheet 4.

Z. C. PHILLIPS.
GRINDING MILL.

No. 246,906. Patented Sept. 13, 1881.

Witnesses:
P. C. Dieterich
F. G. Dieterich.

Inventor:
Zachariah C. Phillips.
By J. J. Johnston.
his attorney.

UNITED STATES PATENT OFFICE.

ZACHARIAH C. PHILLIPS, OF ALLEGHENY, PENNSYLVANIA.

GRINDING-MILL.

SPECIFICATION forming part of Letters Patent No. 246,906, dated September 13, 1881.

Application filed February 12, 1881. (No model.)

*To all whom it may concern:*

Be it known that I, ZACHARIAH C. PHILLIPS, of Allegheny, in the county of Allegheny, State of Pennsylvania, have invented a new and useful Improvement in Grinding-Mills; and I do hereby declare that the following is a full and exact description thereof, reference being had to the accompanying drawings, and to the letters of reference marked thereon.

My invention relates to an improvement in grinding-mills; and it consists, first, in the combination of a pair of metallic grinding-plates having irregular-formed grinding-ribs, made square in cross-section, and extending from the periphery toward the center of said plates, and intersected by a series of annular grinding and retarding ribs; second, in the combination of said metallic grinding-plates with a revolving feeder having a series of feeding-wings and an axially-adjustable disk having two projecting curved plates arranged opposite each other, and between which said feeder revolves, all arranged in the feeding-throat of the mill; third, in a grinding-mill, the combination, with a revolving feeder having a series of feeding-wings arranged in the feeding-throat of the mill, of a disk having two projecting curved plates arranged opposite each other, with projecting ends extending through the side of said throat, and upon which is secured a wheel having a portion of its periphery provided with teeth, into which a worm gears, through the medium of which said disk, with its curved plates, is adapted to be axially adjusted for regulating the size of the inlet and outlet openings of said feeding-throat, all of which will hereinafter more fully appear.

To enable others skilled in the art with which my invention is most nearly connected to make and use it, I will proceed to describe its construction and operation.

Figure 1:
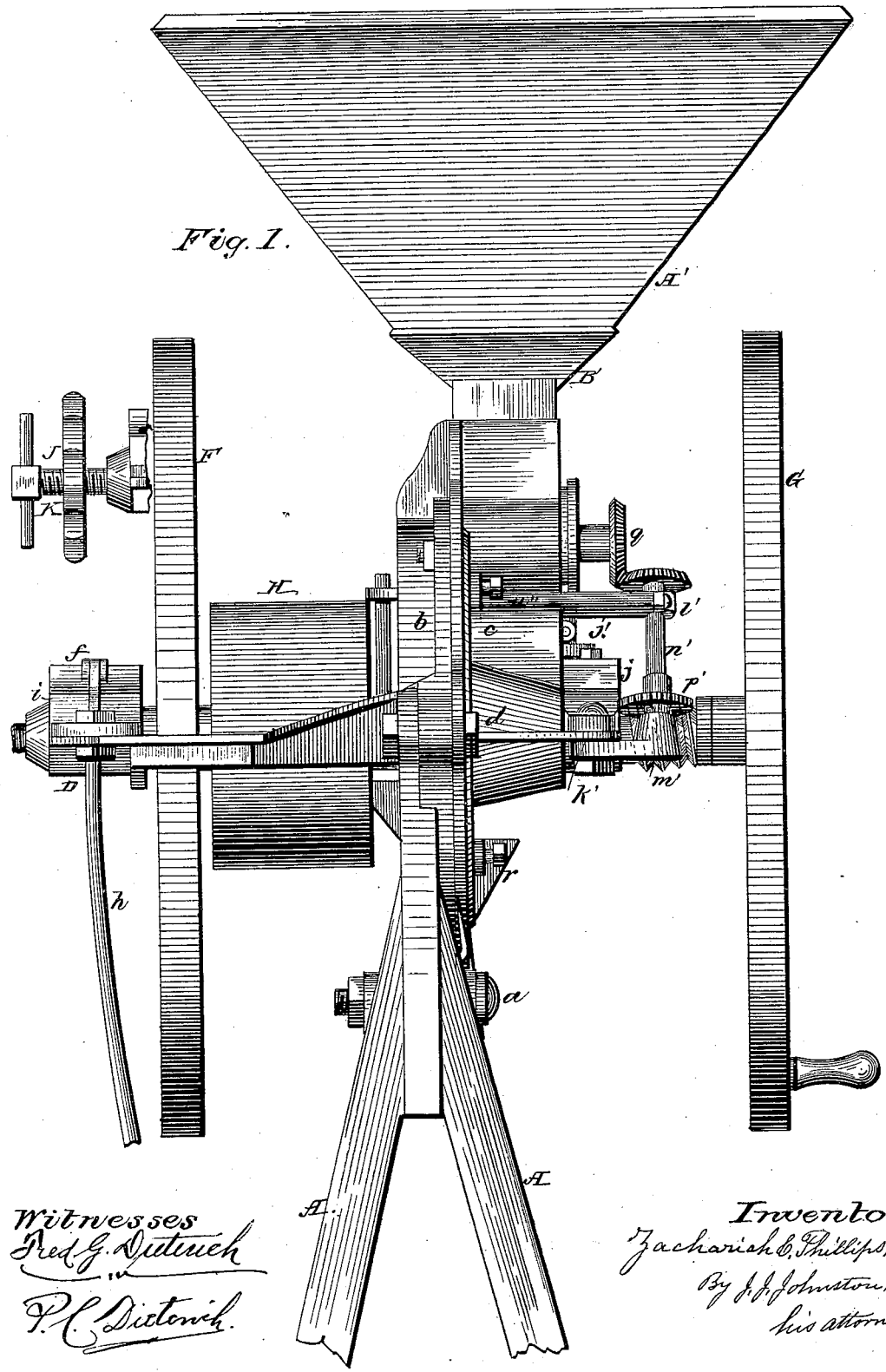
Figure 2:
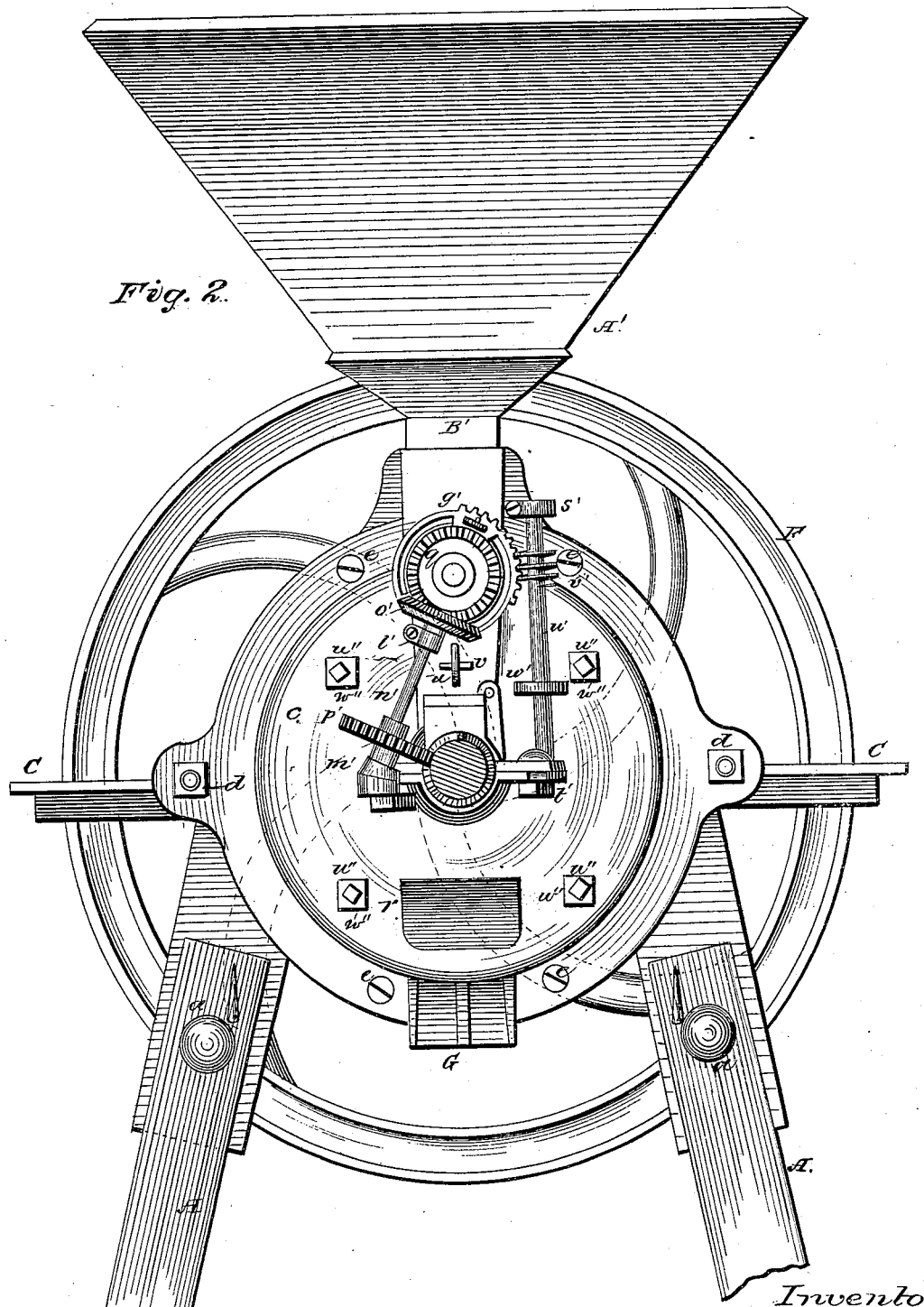
Figure 3:
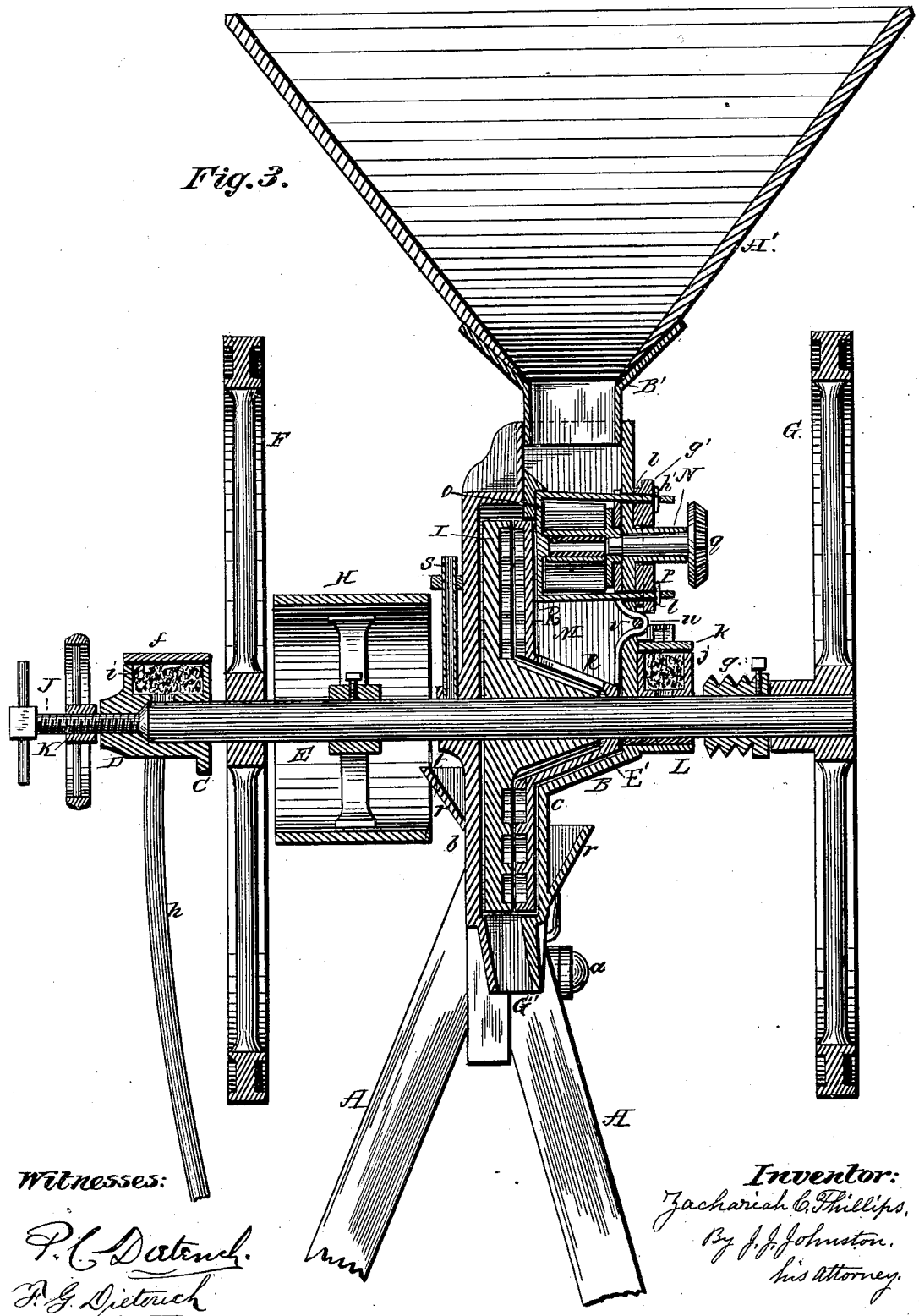
Figure 4:
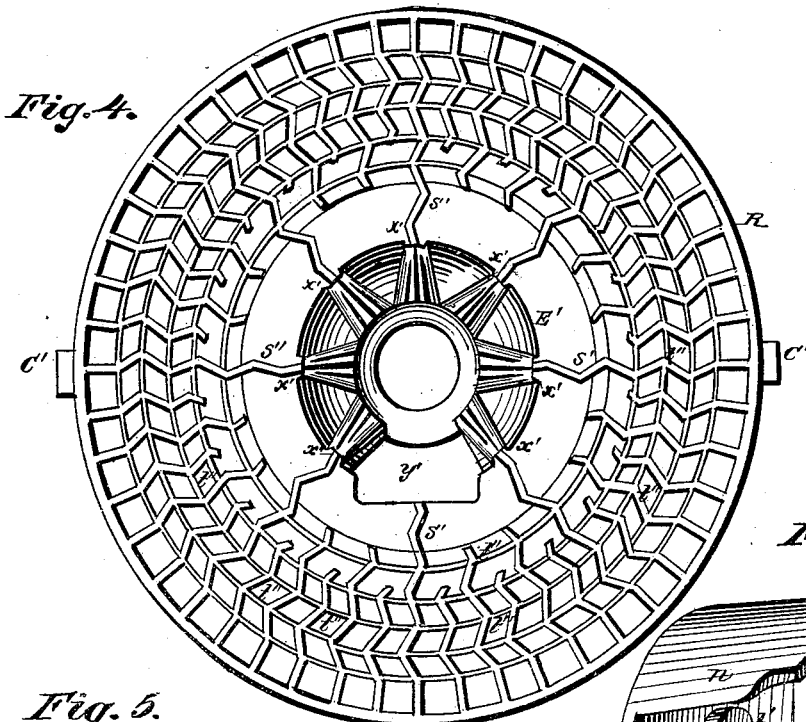
Figure 5:
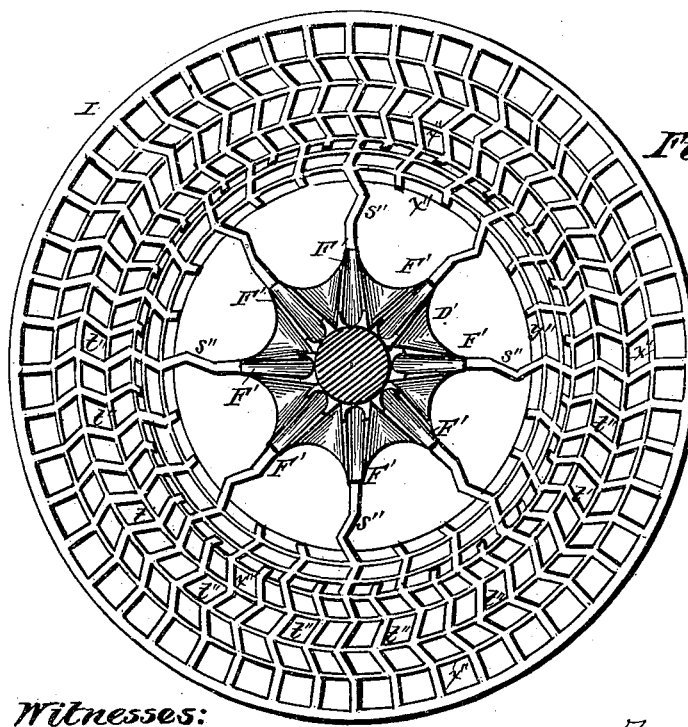
Figure 6:
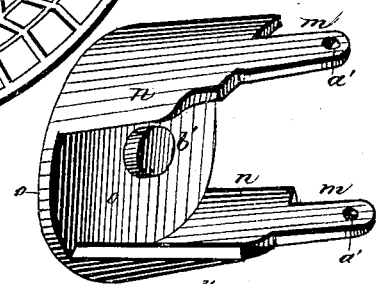
Figure 7:
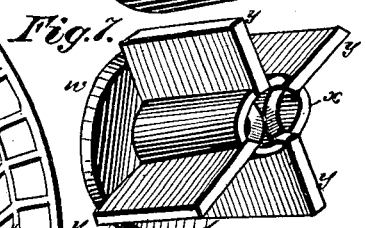
Figure 8:
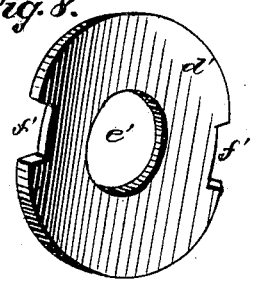

In the accompanying drawings, which form part of this specification, Figure 1 is an end elevation of my improvement in grinding-mills. Fig. 2 is a front side elevation of the same. Fig. 3 is a vertical section of the same. Fig. 4 is a face view of the stationary grinding-plate. Fig. 5 is a face view of the revolving grinding-plate. Figs. 6, 7, and 8 are detail views, in perspective, of parts of the feeding device.

In the accompanying drawings, similar letters of reference refer to the same parts in the several figures of said drawings.

A represents the legs for supporting the mill, and are bolted at *a* to the shell B, constructed in two parts, *b* and *c*, held together by means of bolts *d* and screws *e*, as shown in Figs. 1 and 2.

To the part *b* of the shell B is secured a yoke, C, in which, at *f*, is a capped bearing, D, for the driving-shaft E, upon which are secured balance-wheels F G, driving-pulley H, worm-wheel *g*, and the revolving grinding-plate I. In the bearing is an adjusting-screw, J, on which is a clamping screw-nut, K, for holding the adjusting-screw J in a fixed position in the bearing D with relation to the end of the driving-shaft E. The yoke C is braced by means of rods *h*. The bearing D is provided with a lubricating-chamber, *i*, having a cap or lid, *f*.

The part *c* of the shell B is provided with a bearing, L, for the driving-shaft E, and is furnished with a lubricating-chamber, *j*, having a cap or lid, *k*. The feed-throat M is formed in the part *c* of the shell B, in which are openings *l*, through which project the lugs *m* of the curved plates *n* of the disk *o*. (Shown in Fig. 6.) On the part *c* of the shell B is a tubular bearing, N, for the axis *p* of the wheel *q*. The parts *b* and *c* of the shell B are furnished with chambers *r* for catching the waste oil that may run down on said shell from the driving-shaft E.

To the part *b* of the shell B is attached a tube, S, used for lubricating the driving-shaft E and bearing *t*.

The stationary grinding-plate R is held in the part *c* of the shell B while putting the several parts together by means of a curved spring, *u*, and a pin, *v*, as shown in Figs. 2 and 3.

The hopper A' is constructed of wood, and is of the usual form, and is attached to a square bell-mouth tube, B', which is fitted in the feeding-throat M in the part *c* of the shell B.

One part of the feeding device (see Fig. 7) consists of the disk *w*, having a slotted tube, *x*, in the slots of which are placed elastic wings *y*; but, if desired, these wings may be cast in one piece with the tube *x* and disk *w*; but preference is given to the elastic rubber wings, as they will yield in case of any choking in the throat M by clogging of the grain. Another part of the feeding device (see Fig. 6) consists of a disk, o, having curved plates n, from which project lugs m, furnished with openings a', for the reception of the pins h'. (Shown in Fig. 3.) In the center of the disk o is a cylindrical projection, b', which fits a central opening in the disk w. The other part of the feeding device (see Fig. 8) consists of a disk, d', having a center opening, e', for the reception of the slotted tube x, and in the periphery of the disk d' are recesses f' for the lugs m. These several parts are placed together in the following order: The part shown in Fig. 7 is placed between the curved plates n of the part shown in Fig. 6, with the cylindrical projection b' entering the opening in the disk w. The disk d' (shown in Fig. 8) is placed on the parts shown in Figs. 6 and 7, with the slotted tube x through the openings e' and the lugs m in the recesses f'. The lugs m are then placed in the openings l of the part c of shell B. (See Fig. 3.) A wheel, g', having openings in it adapted to receive the lugs m, is then placed on said lugs and secured thereon by means of pins h', all of which parts are shown in juxtaposition in Fig. 3, with the axis of the wheel g' placed in the tubular bearing N, with the inner end of said axis coupled in the slotted tube x of the feeding device.

From the part c of the shell B project outward two arms, j' and k', in which are bearings l' and m', for the shaft n' of the wheels o' and p', the wheel o' meshing with the worm-wheel q, and the wheel p' meshing with the wheel g. On the part c of the shell B are also bearings s' and t', for a small vertical shaft, u', on which is a worm-wheel, v', and a finger-disk, w'. The worm-wheel v' meshes into the teeth of wheel g', as shown in Fig. 2.

The stationary grinding-plate R has a hollow cone, E', on the inner side of which are teeth x', radiating from the apex of said cone to its base, and in said plate and cone is an opening, y', for the admission of the grain between the grinding-plates I and R. On the periphery of the grinding-plate R are two projections, C', which fit into recesses in the part c of the shell B, and are used for the purpose of preventing the said plate from turning in the shell B. The revolving grinding-plate I has at its center a cone, D', furnished with teeth F', which extend from the apex to its base, where they unite with the grinding-ribs s''. This cone D' is fitted to and adapted to enter the hollow cone E' of the grinding-plate R, as shown in Fig. 3. The teeth F' and x' of the cones D' and E' are of greatest depth at the apex of said cones, and gradually diminish in depth to the base thereof and diverge toward the grinding-ribs s'', as shown in Figs. 4 and 5.

The grinding-plates I and R are furnished respectively with grinding-ribs s'' and t'', which are arranged in irregular radial lines, and are square when viewed in cross-section, as shown in Fig. 3. By having the grinding-ribs s'' and t'' on irregular radial lines and square in cross-section three desirable results are secured, to wit: First, the irregular form gives increased length of the cutting or grinding edges of said ribs; second, the irregular form gives to said ribs a shearing, cutting, or grinding action to their edges in the operation of grinding; third, said ribs being square in cross-section, when the acting, cutting, or grinding edges wear and become too round or dull for effective and speedy grinding, by reversing the motion of the revolving grinding-plate I, a new set of cutting or grinding edges of said ribs will be brought into action— that is to say, by frequently reversing the motion of the grinding-plate I, the grinding-ribs s'' and t'' will have sharp cutting or grinding edges until said ribs are entirely worn away.

The annular grinding-rings x'' serve the purpose of retarders and prevent the partially-ground grain from traveling too rapidly toward the periphery of the grinding-plates, said annular grinding-rings serving a twofold purpose—to wit, first, grinding, and, second, compensating for the centrifugal action caused by the rapid revolution of the grinding-plate I, and subjecting the grain to the full action of the grinding-ribs throughout the entire length.

The grinding-plates I and R are made separate from the shell B, and are constructed of hard metal, and are adjusted with relation to each other by means of set-screws u''', having clamping-nuts w'''. When the grinding-plates are brought together, as shown in Fig. 3, there will be a narrow space between them, which space gradually diminishes from the base of the cones D' and E' toward the periphery of said plates.

The skillful mechanic will from the foregoing description, and by reference to the accompanying drawings, readily understand the construction and arrangement of the several parts hereinbefore described, and the relation that said parts bear to each other. I will therefore proceed to describe the operation of my improvement, which is as follows: The operator, by means of the finger-disk w' on the vertical shaft u', rotates the worm-wheel v', which will axially adjust the disk o, with its curved plates n, so as to increase or diminish the inlet or outlet of the feeding device in accordance with the grade of grinding required, the kind of grain to be ground, and the speed given to the grinding-plate I. The hopper A' being charged with grain, power is applied to the pulley H, which will revolve the shaft E and grinding-plate I and the worm-wheel g, which will revolve the wheel p', shaft n', and wheel o', which will revolve the wheel q and its shaft p, which will revolve the slotted tube x and disk w, which will revolve the feeding-wings y, thereby feeding the grain from the hopper A' to the grinding-plates I and R in proper quantities, which will be in proportion to the size of the inlet and outlet formed in the feeding-throat M by the adjustment of the curved plates n of the feeding device. The grain, as it is fed to the grinding-plates I and R, is cut or broken up by the teeth F' and x', and, passing between the grinding-plates I and R, is subjected to the cutting and grinding action of the grinding-ribs $s''$ and $t''$ and annular rings $x''$, and the ground product is finally discharged from the chute G' into any suitable receiver.

Having thus described my improvement, what I claim as of my invention is—

1. In a grinding-mill, the combination of a pair of metallic grinding-plates having irregular-formed grinding-ribs made square in cross-section, and extending from the periphery toward the center of said plates, and intersected by a series of annular grinding and retarding ribs, substantially as herein specified.

2. In a grinding-mill, the combination, with a revolving feeder having a series of feeding-wings, of an axially-adjustable disk having two projecting curved plates arranged opposite each other, and between which said feeder revolves, all arranged in the throat of said mill, substantially as herein described, and for the purpose set forth.

3. In a grinding-mill, the combination, with a revolving feeder having a series of feeding-wings arranged in the feeding-throat of the mill, of a disk having two projecting curved plates arranged opposite each other, with projecting ends extending through the sides of the throat, and upon which is secured a wheel having a portion of its periphery provided with teeth, into which mesh a worm-gear, through the medium of which said disk, with its curved plates, is adapted to be axially adjusted for regulating the size of the inlet and outlet openings of said feeding-throat, substantially as herein described, and for the purpose set forth.

Z. C. PHILLIPS.

Witnesses:
A. C. JOHNSTON,
J. J. JOHNSTON.